United States Patent
Laughter

(10) Patent No.: US 10,361,553 B1
(45) Date of Patent: Jul. 23, 2019

(54) BATTERY INTERRUPTER

(71) Applicant: Gerald Laughter, Elko, NV (US)

(72) Inventor: Gerald Laughter, Elko, NV (US)

(*) Notice: Subject to any disclaimer, the term of this patent is extended or adjusted under 35 U.S.C. 154(b) by 0 days.

(21) Appl. No.: 15/880,367

(22) Filed: Jan. 25, 2018

(51) Int. Cl.
    *H02H 5/00* (2006.01)
    *H02H 7/08* (2006.01)

(52) U.S. Cl.
    CPC ............ *H02H 7/0833* (2013.01); *H02H 5/00* (2013.01)

(58) Field of Classification Search
    CPC .......... F02B 1/04; F02B 3/06; F02D 41/0032; F02D 41/062; F02D 41/042; B60W 10/107; B60W 30/884; B60W 10/16; B60W 2510/0604; B60W 2510/0671; B60W 2510/0676; B60W 30/192
    See application file for complete search history.

(56) References Cited

U.S. PATENT DOCUMENTS

| | | | | |
|---|---|---|---|---|
| 4,858,825 A | * | 8/1989 | Kawamura | F23N 5/242 237/2 A |
| 5,257,190 A | * | 10/1993 | Crane | B60R 16/0231 340/459 |
| 5,285,189 A | * | 2/1994 | Nowicki | A44B 15/005 200/61.22 |
| 6,285,931 B1 | * | 9/2001 | Hattori | G07C 5/008 340/426.15 |
| 2002/0144667 A1 | * | 10/2002 | Ito | F01P 11/20 123/179.3 |
| 2005/0021304 A1 | * | 1/2005 | Hirashima | G01R 31/006 702/185 |
| 2005/0052081 A1 | * | 3/2005 | Sayama | H02J 1/14 307/10.1 |

* cited by examiner

*Primary Examiner* — Rina I Duda
(74) *Attorney, Agent, or Firm* — Morriss O'Bryant Compagni Cannon, PLLC

(57) ABSTRACT

A battery interrupter system including an electrical motor for a machine, at least one battery which powers an electrical system of a machine, a programmable logic controller electrically connected to the electrical system and an ignition electrically connected to the programmable logic controller. The battery interrupter system also includes a button, which initiates the battery interrupter system, is connected to the programmable logic controller, at least one contactor electrically connected to the at least one battery and the programmable logic controller, wherein the programmable logic controller is configured to sends a signal to the at least one contactor to latch-in the contactor and enable an electrical connection between the at least one battery and the electrical system of the machine, and a detection sensor electrically connected to the programmable logic controller, wherein the detection sensor identifies operating conditions of the electrical system.

18 Claims, 8 Drawing Sheets

BATTERY INTERRUPTER

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND

1. The Field of the Present Disclosure

The present disclosure relates generally to battery interrupter systems that can be used to insulate batteries or power sources from heavy machinery or vehicle in times of inactivity or in the presence of a hazard, such as fire or excessive heat.

2. Description of Related Art

The need to protect engines, motors and electrical systems from damaging or destructive operating conditions is essential for the proper operation of machinery or vehicles. Continued operation of an operating system under hazard conditions, such as fire, can lead to a catastrophic failure of the machine. Monitoring and protection systems are used on machines to discourage operation of the machine when the operating conditions exceed and/or are below acceptable limits. In the past, various systems of varying degrees of sophistication have been developed to monitor conditions in a machine, and/or other parameters, in order to implement an machine protection protocol.

In some monitoring systems, an analog gauge signals the advent of an unacceptable condition. Analog or digital gauges provide continuous readings of, for example, fluid levels and temperatures, but require constant monitoring by an operator.

Aftermarket retrofit systems have been available that electronically monitor certain operating parameters. Typically, these systems work in conjunction with original factory installed engine systems. As such, the aftermarket systems are affected by or affect the existing factory systems, which can result in voiding the warranty on such OEM systems. Additionally, many of the retrofit systems can and are circumvented by component failures, wire disconnects, and/or operator manipulation.

Current operating system protection and monitoring systems do not provide a mechanism for automatically implementing a protocol when parameters are within a predetermined fault condition.

The invention as herein disclosed and described is directed to a system and protocol for monitoring parameters or conditions and controlling the operating system and accessory functions.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims. Any discussion of documents, acts, materials, devices, articles or the like which has been included in the present specification is not to be taken as an admission that any or all of these matters form part of the prior art base, or were common general knowledge in the field relevant to the present disclosure as it existed before the priority date of each claim of this application.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
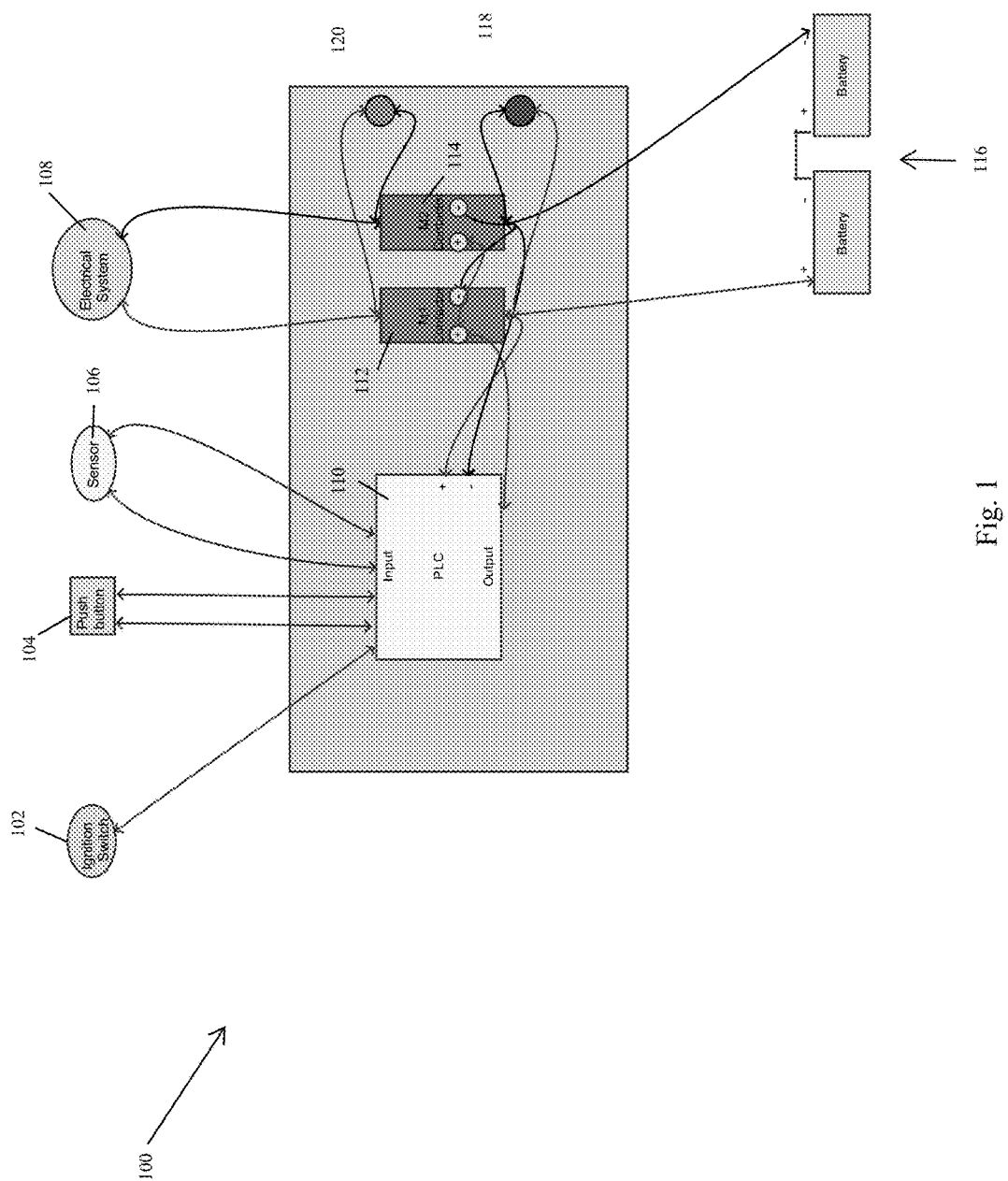
FIG. 1 is a schematic diagram of the battery interrupter system of the disclosed invention.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the present structural embodiments and methods for using and constructing a battery interrupter system are disclosed and described, it is to be understood that this disclosure is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present disclosure will be limited only by the appended claims and equivalents thereof.

It must be noted that, as used in this specification and the appended claims, the singular forms "a," "an," and "the" include plural referents unless the context clearly dictates otherwise.

In describing and claiming the present disclosure, the following terminology will be used in accordance with the definitions set out below.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

Applicant has invented an improved battery interrupter system for heavy machinery or vehicles. This battery interrupter system enable a battery power source to be interrupted and then isolated from the rest of an electronic operating system to prevent or mitigate fire damage and save and conserve battery life when the corresponding heavy machinery or vehicle is not in use. Conventionally, if a fire begins or extends into an engine compartment or electrical housing, the power source (typically a battery) still provides electrical current which exacerbates the fire, requiring faster and often more extreme extinguishing actions. The following detailed description of Applicant's battery interrupter will identify how these conventional heavy machinery fire problems are overcome by the disclosed battery interrupter system.

Figure 2:
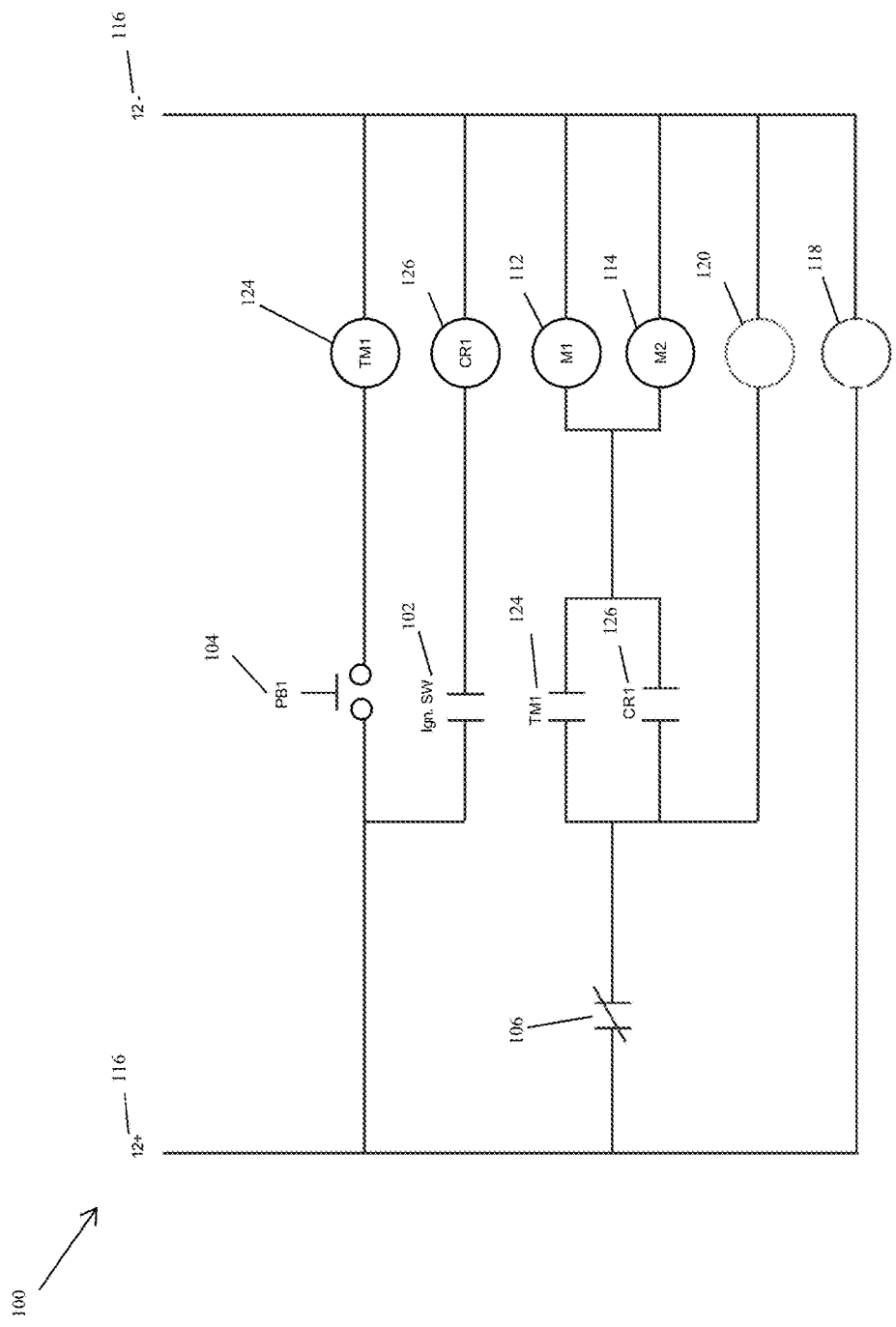
FIG. 2 is a circuit diagram of the embodiment of FIG. 1.

FIGS. 1 and 2, illustrate a schematic diagram and circuit diagram, respectively, identifying the components and corresponding connections of a battery interrupter system 100. The battery interrupter system 100 can be manufactured at the same time as electrical components of a machine or can be retrofit into an existing machine or vehicle. The battery interrupter system 100 can therefore include and cooperate with conventional machine or vehicle operating systems, including operating a motor or engine of the machine.

The battery interrupter system 100 includes an ignition switch 102 and a push button 104, or "on" button, which initiates the system 100. When an operator presses the push button 104 to initiate the system 100, the push button 104 sends an input signal to a programmable logic controller 110, or PLC, to begin starting or initiating the system 100.

When the operator first begins initiating the system 100, from a cold start, contactors 112 and 114 are in an open position, essentially isolating the battery 116, or batteries, from the rest of the system 100. By isolating the battery 116 in this way, the system 100 is not receiving any power, or open to receive power, from the battery 116, thereby conserving the battery power and limiting susceptibility to fire within the system 100. The battery may be 12 volts, as shown in FIGS. 1 and 2, or may be 24 volts or another desired voltage.

When the PLC 110 receives the input signal from the push button 104, the PLC 110 is programmed to send power to the contactors 112 and 114 causing them to latch in. The contactors 112 and 114 are also electrically connected to an electrical system 108, often including a motor, of the heavy machinery or vehicle, providing power thereto via the battery 116. Additionally, when the PLC 110 receives the input signal from the push button 104, the PLC 110 is programmed to start a timer 124 which begins a predetermined countdown. The countdown can be preset, or changed, if desired. For example, the countdown can be set at 5 minutes, or less, or more. If after the countdown ends and the PLC 110 does not receive an input from an ignition switch 102, then the PLC 110 will time out and send power to the contactors 112 and 114 to unlatch them and again isolate the battery 116. When the contactors are latched in an active state indicator light 120 may illuminate. The indicator light 120 may be visible to the operator to ensure that the system 100 is active and functioning properly.

As also illustrated in the circuit diagram in FIG. 2, when the contactors 112 and 114 are latched in and an input signal from the ignition switch 102 is received by the PLC 110, the battery 116 will maintain connection with the contactors 112 and 114 and provide power to the system 100 in an active state. When the system 100 is in the active state, the system 100 is monitored by at least one sensor 106, in at least one of three ways. The sensor 106 can monitor pressure, as with an Ansul system, or monitor heat, such as spot detecting with spot detector, or monitor flames, as with a fire eye sensor. The sensor 106 in FIG. 2 is a pressure monitoring sensor, such as an Ansul system. If at any time the sensor 106 detects a hazard or problem, the sensor 106 sends a signal to the PLC 110. Additionally, is at any time the system 100 is not active or has detected a hazard, a second indicator light 118, such as a red light, may be illuminated indicating to the operator that the system is no longer active or receiving power from the battery 116.

Upon receiving a hazard signal from the sensor 106 the PLC 110 sends power, a voltage, to unlatch the contactors 112 and 114 to again isolate the battery and mitigate any damage done by the hazard. If no hazard is detected then the sensor will maintain the completed circuit through the timer 124 and start relay 128.

In situations where the heavy machinery or vehicle has been used without problem or hazard detection, at the end of operation when the operator is finished using the equipment, the ignition switch 102 is turned off, and the timer 124 will once again start its countdown. Once the countdown is completed without the ignition switch 102 being restarted, the PLC 110 will send power to unlatch the contactors 112 and 114 and isolate the battery 116, facilitating a longer battery life since the battery will be isolated from the machine while the machine is not in use.

Figure 3:
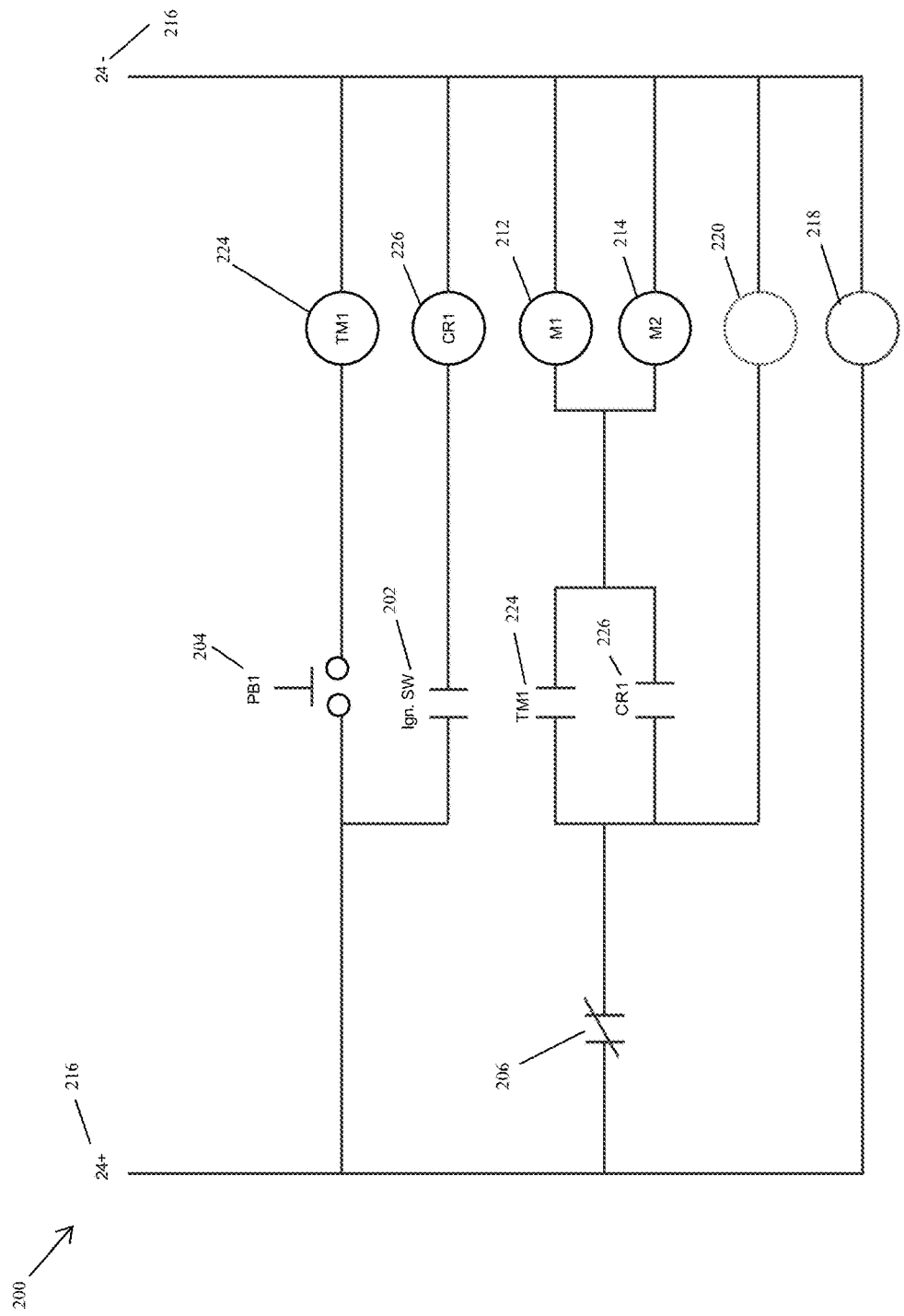
FIG. 3 is a circuit diagram of another embodiment of the invention.

In another embodiment of the disclosed invention, as shown in FIG. 3, a battery interrupter system 200 includes an ignition switch 202 and a push button 204, or "on" button, which initiates the system 200. When an operator presses the push button 204 to initiate the system 200, the push button 204 sends an input signal to a programmable logic controller 210, or PLC, to begin starting or initiating the system 200.

When the operator first begins initiating the system 200, from a cold start, contactors 212 and 214 are in an open position, essentially isolating the battery 216, or batteries, from the rest of the system 200. By isolating the battery 216 in this way, the system 200 is not receiving any power, or open to receive power, from the battery 216, thereby conserving the battery power and limiting susceptibility to fire within the system 100. The battery 216 may be 24 volts, as shown in FIG. 3, or may be 12 volts or another desired voltage.

When the PLC 210 receives the input signal from the push button 204, the PLC 210 is programmed to send power to the contactors 112 and 114 causing them to latch in. Additionally, when the PLC 210 receives the input signal from the push button 204, the PLC 210 is programmed to start a timer 224 which begins a predetermined countdown. The countdown can be preset, or changed, if desired. For example, the countdown can be set at 5 minutes, or less, or more. If after the countdown ends and the PLC 210 does not receive an input from an ignition switch 202, then the PLC 210 will time out and send power to the contactors 212 and 214 to unlatch them and again isolate the battery 216. When the contactors are latched in an active state indicator light 220 may illuminate. The indicator light 220 may be visible to the operator to ensure that the system 200 is active and functioning properly.

As also illustrated in the circuit diagram in FIG. 3, when the contactors 212 and 214 are latched in and an input signal from the ignition switch 202 is received by the PLC 210, the battery 216 will maintain connection with the contactors 212 and 214 and provide power to the system 200 in an active state. When the system 200 is in the active state, the system 200 is monitored by at least one sensor 206, in at least one of three ways. The sensor 206 can monitor pressure, as with an Ansul system, or monitor heat, such as spot detecting with spot detector, or monitor flames, as with a fire eye sensor. The sensor 206 in FIG. 3 is a pressure monitoring sensor, such as an Ansul system. If at any time the sensor 206 detects a hazard or problem, the sensor 206 sends a signal to the PLC 210. Additionally, is at any time the system 200 is not active or has detected a hazard, a second indicator light 218, such as a red light, may be illuminated indicating to the operator that the system is no longer active or receiving power from the battery 216.

Upon receiving a hazard signal from the sensor 206 the PLC 210 sends power, a voltage, to unlatch the contactors 212 and 214 to again isolate the battery and mitigate any damage done by the hazard. If no hazard is detected then the sensor will maintain the completed circuit through the timer 224 and start relay 228.

In situations where the heavy machinery or vehicle has been used without problem or hazard detection, at the end of operation when the operator is finished using the equipment, the ignition switch 202 is turned off, and the timer 224 will once again start its countdown. Once the countdown is completed without the ignition switch 202 being restarted, the PLC 210 will send power to unlatch the contactors 212 and 214 and isolate the battery 216, facilitating a longer battery life since the battery will be isolated from the machine while the machine is not in use.

Figure 4:
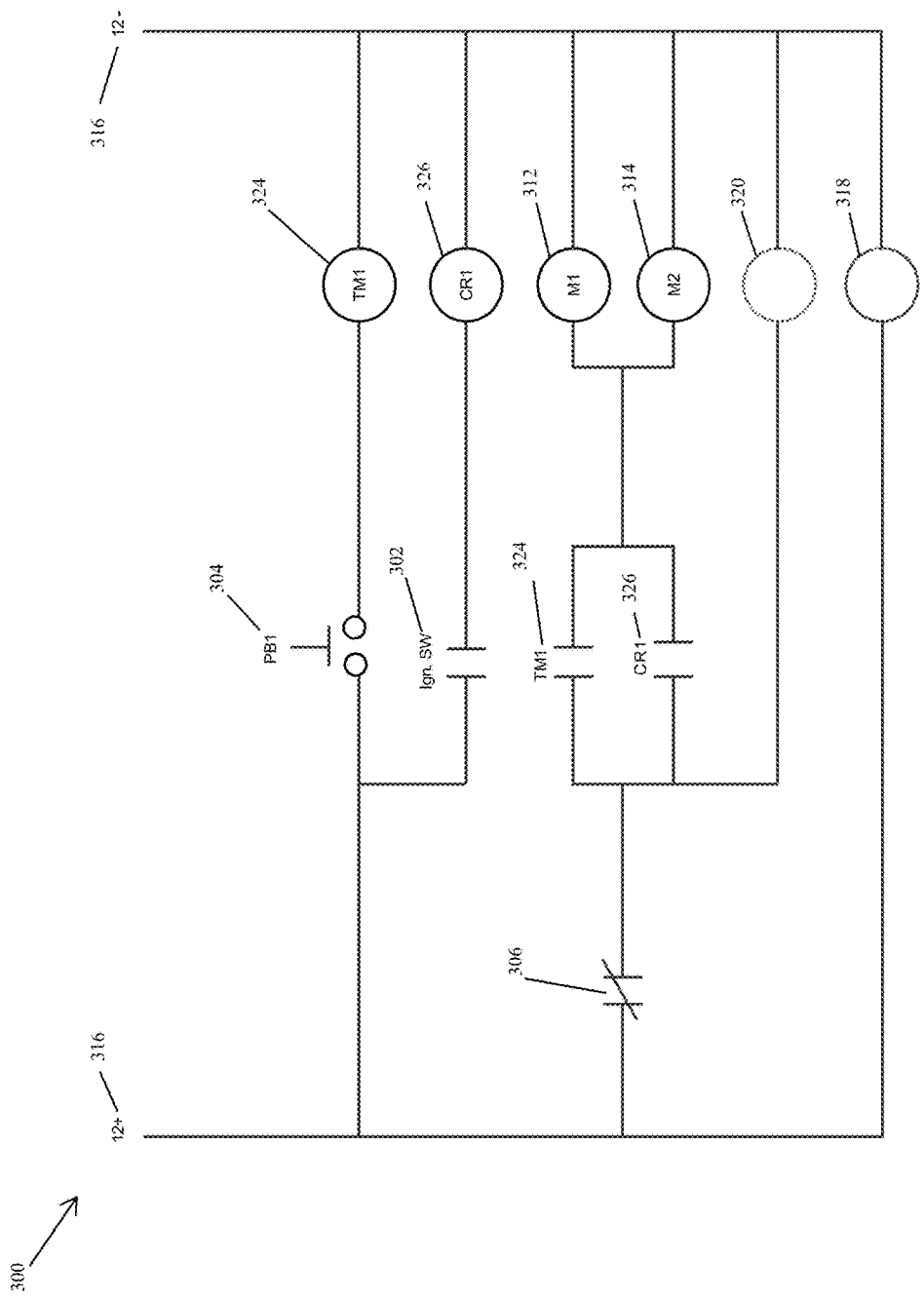
FIG. 4 is a circuit diagram of another embodiment of the invention.

In another embodiment of the disclosed invention, as shown in FIG. 4, a battery interrupter system 300 includes an ignition switch 302 and a push button 304, or "on" button, which initiates the system 300. When an operator presses the push button 304 to initiate the system 300, the push button 304 sends an input signal to a programmable logic controller 310, or PLC, to begin starting or initiating the system 300.

When the operator first begins initiating the system 300, from a cold start, contactors 312 and 314 are in an open position, essentially isolating the battery 316, or batteries, from the rest of the system 300. By isolating the battery 316 in this way, the system 300 is not receiving any power, or open to receive power, from the battery 316, thereby conserving the battery power and limiting susceptibility to fire within the system 300. The battery 316 may be 12 volts, as shown in FIG. 4, or may be 24 volts or another desired voltage.

When the PLC 310 receives the input signal from the push button 304, the PLC 310 is programmed to send power to the contactors 312 and 314 causing them to latch in. Additionally, when the PLC 310 receives the input signal from the push button 304, the PLC 310 is programmed to start a timer 324 which begins a predetermined countdown. The countdown can be preset, or changed, if desired. For example, the countdown can be set at 5 minutes, or less, or more. If after the countdown ends and the PLC 310 does not receive an input from an ignition switch 302, then the PLC 310 will time out and send power to the contactors 312 and 314 to unlatch them and again isolate the battery 316. When the contactors are latched in an active state indicator light 320 may illuminate. The indicator light 320 may be visible to the operator to ensure that the system 300 is active and functioning properly.

As also illustrated in the circuit diagram in FIG. 4, when the contactors 312 and 314 are latched in and an input signal from the ignition switch 302 is received by the PLC 310, the battery 316 will maintain connection with the contactors 312 and 314 and provide power to the system 300 in an active state. When the system 300 is in the active state, the system 300 is monitored by at least one sensor 306, in at least one of three ways. The sensor 306 can monitor pressure, as with an Ansul system, or monitor heat, with a spot detector, or monitor flames, as with a fire eye sensor. The sensor 306 in FIG. 4 is a heat monitoring sensor, such as an spot detector. If at any time the sensor 306 detects a hazard or problem, the sensor 306 sends a signal to the PLC 310. Additionally, is at any time the system 300 is not active or has detected a hazard, a second indicator light 318, such as a red light, may be illuminated indicating to the operator that the system is no longer active or receiving power from the battery 316.

Upon receiving a hazard signal from the sensor 306 the PLC 310 sends power, a voltage, to unlatch the contactors 312 and 314 to again isolate the battery and mitigate any damage done by the hazard. If no hazard is detected then the sensor will maintain the completed circuit through the timer 324 and start relay 328.

In situations where the heavy machinery or vehicle has been used without problem or hazard detection, at the end of operation when the operator is finished using the equipment, the ignition switch 302 is turned off, and the timer 324 will once again start its countdown. Once the countdown is completed without the ignition switch 302 being restarted, the PLC 310 will send power to unlatch the contactors 312 and 314 and isolate the battery 316, facilitating a longer battery life since the battery will be isolated from the machine while the machine is not in use.

Figure 5:
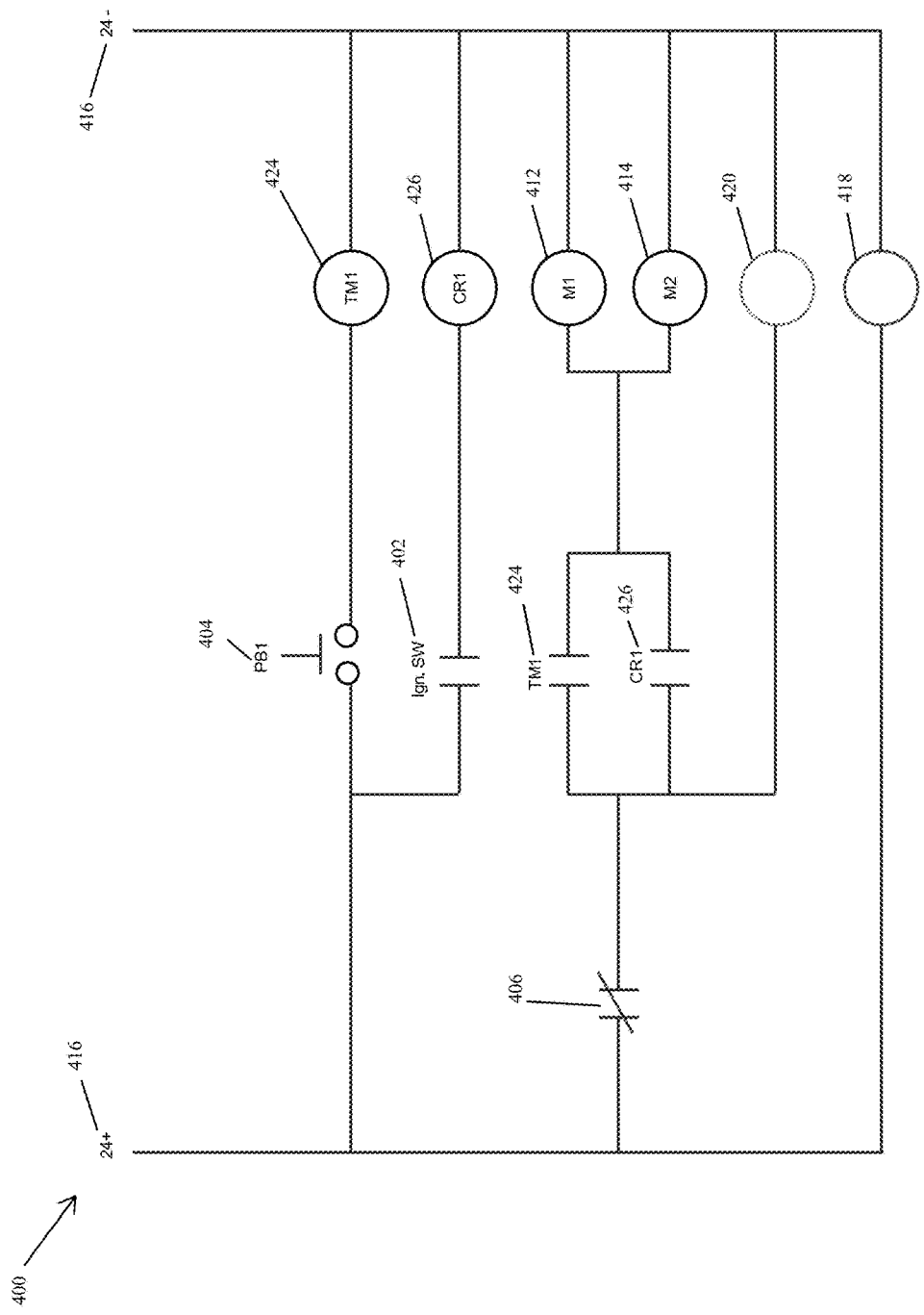
FIG. 5 is a circuit diagram of another embodiment of the invention.

In another embodiment of the disclosed invention, as shown in FIG. 5, a battery interrupter system 400 includes an ignition switch 402 and a push button 404, or "on" button, which initiates the system 400. When an operator presses the push button 404 to initiate the system 400, the push button 404 sends an input signal to a programmable logic controller 410, or PLC, to begin starting or initiating the system 400.

When the operator first begins initiating the system 400, from a cold start, contactors 412 and 414 are in an open position, essentially isolating the battery 416, or batteries, from the rest of the system 400. By isolating the battery 416 in this way, the system 400 is not receiving any power, or open to receive power, from the battery 416, thereby conserving the battery power and limiting susceptibility to fire within the system 400. The battery 416 may be 24 volts, as shown in FIG. 5, or may be 14 volts or another desired voltage.

When the PLC 410 receives the input signal from the push button 404, the PLC 410 is programmed to send power to the contactors 412 and 414 causing them to latch in. Additionally, when the PLC 410 receives the input signal from the push button 404, the PLC 410 is programmed to start a timer 424 which begins a predetermined countdown. The countdown can be preset, or changed, if desired. For example, the countdown can be set at 5 minutes, or less, or more. If after the countdown ends and the PLC 410 does not receive an input from an ignition switch 402, then the PLC 410 will time out and send power to the contactors 412 and 414 to unlatch them and again isolate the battery 416. When the contactors are latched in an active state indicator light 420 may illuminate. The indicator light 420 may be visible to the operator to ensure that the system 400 is active and functioning properly.

As also illustrated in the circuit diagram in FIG. 5, when the contactors 412 and 414 are latched in and an input signal from the ignition switch 402 is received by the PLC 410, the battery 416 will maintain connection with the contactors 412 and 414 and provide power to the system 400 in an active state. When the system 400 is in the active state, the system 400 is monitored by at least one sensor 406, in at least one of three ways. The sensor 406 can monitor pressure, as with an Ansul system, or monitor heat, with a spot detector, or monitor flames, as with a fire eye sensor. The sensor 406 in FIG. 5 is a heat monitoring sensor, such as an spot detector. If at any time the sensor 406 detects a hazard or problem, the sensor 406 sends a signal to the PLC 410. Additionally, is at any time the system 400 is not active or has detected a hazard, a second indicator light 418, such as a red light, may be illuminated indicating to the operator that the system is no longer active or receiving power from the battery 416.

Upon receiving a hazard signal from the sensor 406 the PLC 410 sends power, a voltage, to unlatch the contactors 412 and 414 to again isolate the battery and mitigate any damage done by the hazard. If no hazard is detected then the sensor will maintain the completed circuit through the timer 424 and start relay 428.

In situations where the heavy machinery or vehicle has been used without problem or hazard detection, at the end of operation when the operator is finished using the equipment, the ignition switch 402 is turned off, and the timer 424 will once again start its countdown. Once the countdown is completed without the ignition switch 402 being restarted, the PLC 410 will send power to unlatch the contactors 412 and 414 and isolate the battery 416, facilitating a longer battery life since the battery will be isolated from the machine while the machine is not in use.

Figure 6:
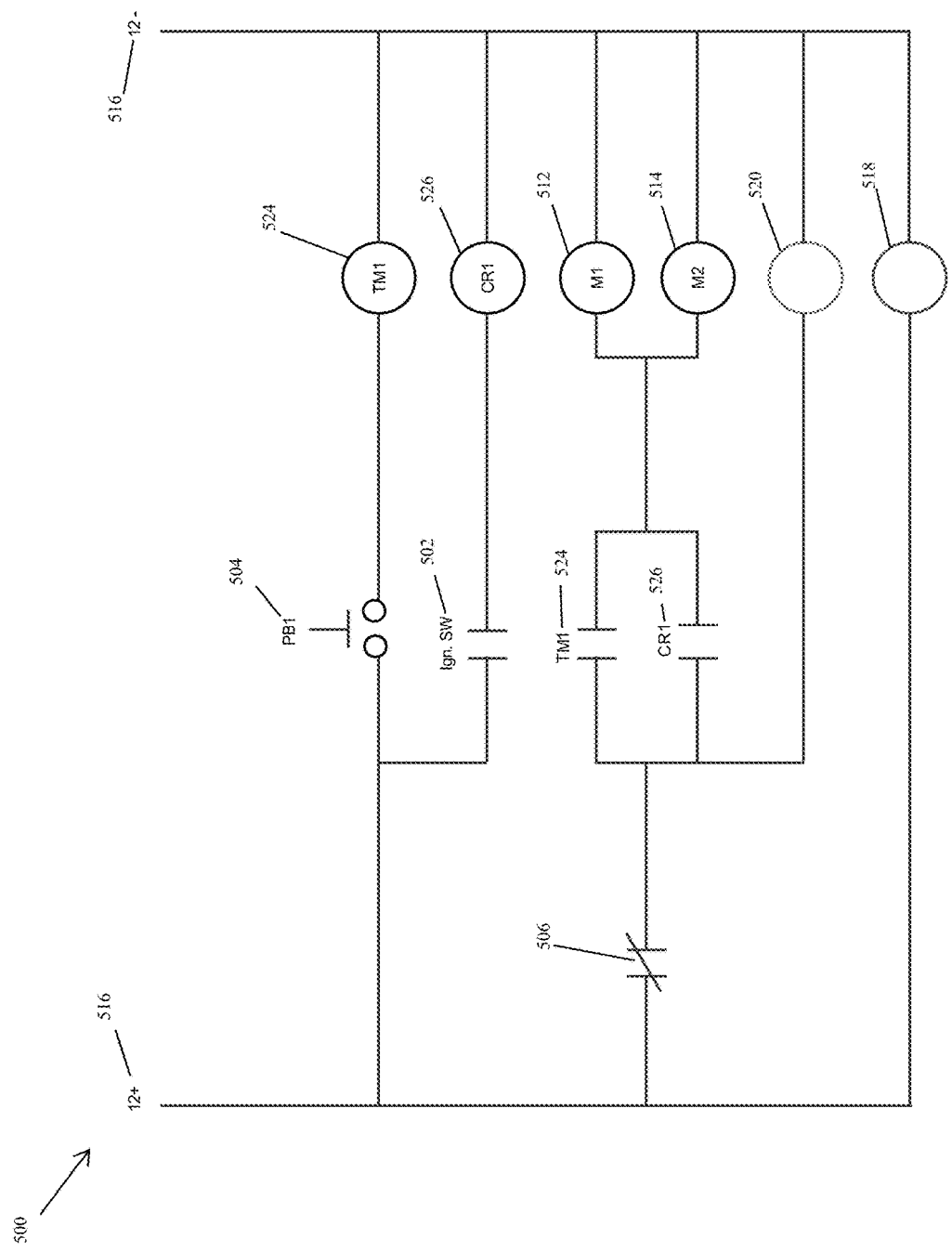
FIG. 6 is a circuit diagram of another embodiment of the invention.

In another embodiment of the disclosed invention, as shown in FIG. 6, a battery interrupter system 500 includes an ignition switch 502 and a push button 504, or "on" button, which initiates the system 500. When an operator presses the push button 504 to initiate the system 500, the push button 504 sends an input signal to a programmable logic controller 510, or PLC, to begin starting or initiating the system 500.

When the operator first begins initiating the system 500, from a cold start, contactors 512 and 514 are in an open position, essentially isolating the battery 516, or batteries, from the rest of the system 500. By isolating the battery 516 in this way, the system 500 is not receiving any power, or open to receive power, from the battery 516, thereby conserving the battery power and limiting susceptibility to fire within the system 500. The battery 516 may be 12 volts, as shown in FIG. 6, or may be 24 volts or another desired voltage.

When the PLC 510 receives the input signal from the push button 504, the PLC 510 is programmed to send power to the contactors 512 and 514 causing them to latch in. Additionally, when the PLC 510 receives the input signal from the push button 504, the PLC 510 is programmed to start a timer 524 which begins a predetermined countdown. The countdown can be preset, or changed, if desired. For example, the countdown can be set at 5 minutes, or less, or more. If after the countdown ends and the PLC 510 does not receive an input from an ignition switch 502, then the PLC 510 will time out and send power to the contactors 512 and 514 to unlatch them and again isolate the battery 516. When the contactors are latched in an active state indicator light 520 may illuminate. The indicator light 520 may be visible to the operator to ensure that the system 500 is active and functioning properly.

As also illustrated in the circuit diagram in FIG. 6, when the contactors 512 and 514 are latched in and an input signal from the ignition switch 502 is received by the PLC 510, the battery 516 will maintain connection with the contactors 512 and 514 and provide power to the system 500 in an active state. When the system 500 is in the active state, the system 500 is monitored by at least one sensor 506, in at least one of three ways. The sensor 506 can monitor pressure, as with an Ansul system, or monitor heat, with a spot detector, or monitor flames, as with a fire eye sensor. The sensor 506 in FIG. 6 is a flame monitoring sensor, such as a fire eye sensor. If at any time the sensor 506 detects a hazard or problem, the sensor 506 sends a signal to the PLC 510. Additionally, is at any time the system 500 is not active or has detected a hazard, a second indicator light 518, such as a red light, may be illuminated indicating to the operator that the system is no longer active or receiving power from the battery 516.

Upon receiving a hazard signal from the sensor 506 the PLC 510 sends power, a voltage, to unlatch the contactors 512 and 514 to again isolate the battery and mitigate any damage done by the hazard. If no hazard is detected then the sensor will maintain the completed circuit through the timer 524 and start relay 528.

In situations where the heavy machinery or vehicle has been used without problem or hazard detection, at the end of operation when the operator is finished using the equipment, the ignition switch 502 is turned off, and the timer 524 will once again start its countdown. Once the countdown is completed without the ignition switch 502 being restarted, the PLC 510 will send power to unlatch the contactors 512 and 514 and isolate the battery 516, facilitating a longer battery life since the battery will be isolated from the machine while the machine is not in use.

Figure 7:
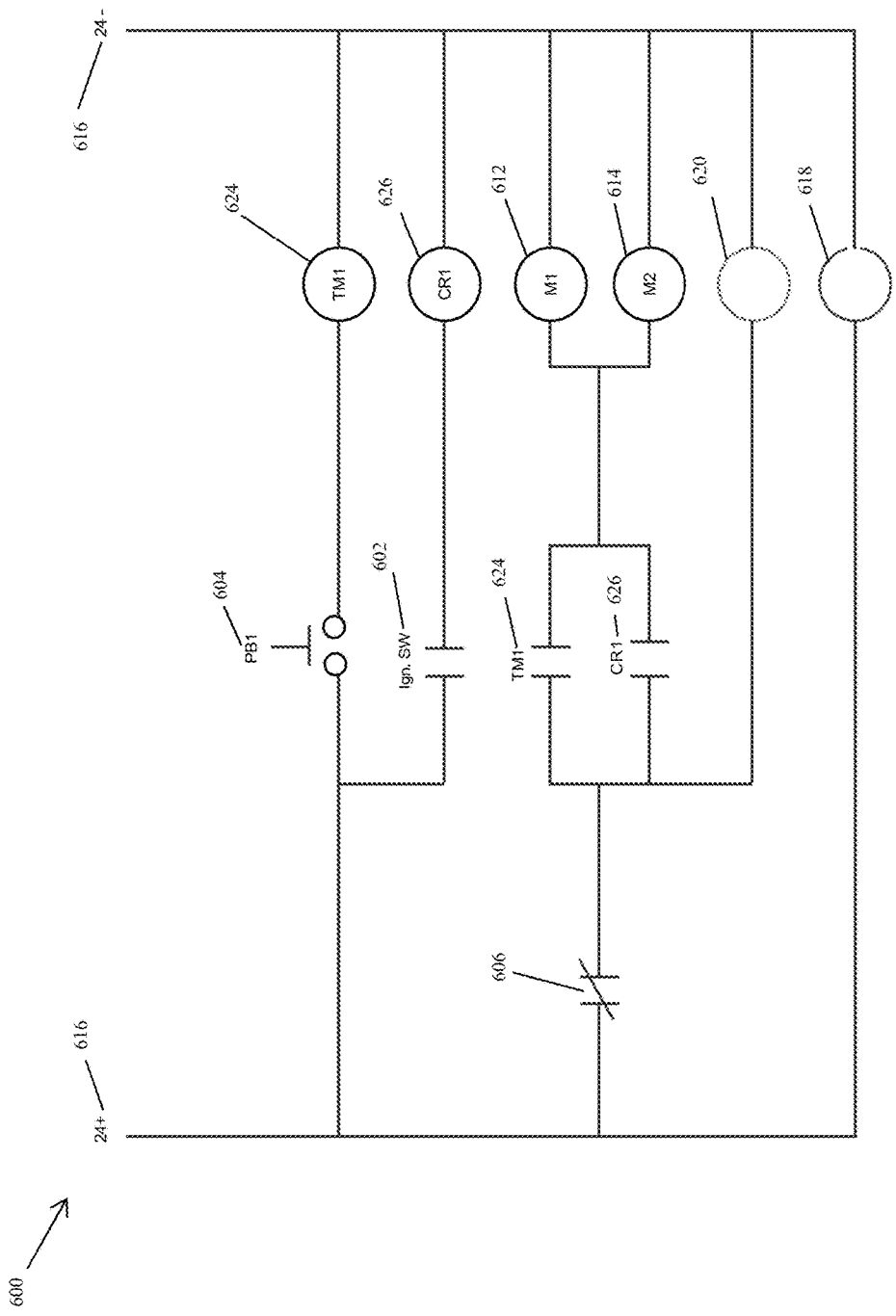
FIG. 7 is a circuit diagram of another embodiment of the invention.

In another embodiment of the disclosed invention, as shown in FIG. 7, a battery interrupter system 600 includes an ignition switch 602 and a push button 604, or "on" button, which initiates the system 600. When an operator presses the push button 604 to initiate the system 600, the push button 604 sends an input signal to a programmable logic controller 610, or PLC, to begin starting or initiating the system 600.

When the operator first begins initiating the system 600, from a cold start, contactors 612 and 614 are in an open position, essentially isolating the battery 616, or batteries, from the rest of the system 600. By isolating the battery 616 in this way, the system 600 is not receiving any power, or open to receive power, from the battery 616, thereby conserving the battery power and limiting susceptibility to fire within the system 600. The battery 616 may be 24 volts, as shown in FIG. 7, or may be 12 volts or another desired voltage.

When the PLC 610 receives the input signal from the push button 604, the PLC 610 is programmed to send power to the contactors 612 and 614 causing them to latch in. Additionally, when the PLC 610 receives the input signal from the push button 604, the PLC 610 is programmed to start a timer 624 which begins a predetermined countdown. The countdown can be preset, or changed, if desired. For example, the countdown can be set at 6 minutes, or less, or more. If after the countdown ends and the PLC 610 does not receive an input from an ignition switch 602, then the PLC 610 will time out and send power to the contactors 612 and 614 to unlatch them and again isolate the battery 616. When the contactors are latched in an active state indicator light 620 may illuminate. The indicator light 620 may be visible to the operator to ensure that the system 600 is active and functioning properly.

As also illustrated in the circuit diagram in FIG. 7, when the contactors 612 and 614 are latched in and an input signal from the ignition switch 602 is received by the PLC 610, the battery 616 will maintain connection with the contactors 612 and 614 and provide power to the system 600 in an active state. When the system 600 is in the active state, the system 600 is monitored by at least one sensor 606, in at least one of three ways. The sensor 606 can monitor pressure, as with an Ansul system, or monitor heat, with a spot detector, or monitor flames, as with a fire eye sensor. The sensor 606 in FIG. 7 is a flame monitoring sensor, such as a fire eye sensor. If at any time the sensor 606 detects a hazard or problem, the sensor 606 sends a signal to the PLC 610. Additionally, is at any time the system 600 is not active or has detected a hazard, a second indicator light 618, such as a red light, may be illuminated indicating to the operator that the system is no longer active or receiving power from the battery 616.

Upon receiving a hazard signal from the sensor 606 the PLC 610 sends power, a voltage, to unlatch the contactors 612 and 614 to again isolate the battery and mitigate any damage done by the hazard. If no hazard is detected then the sensor will maintain the completed circuit through the timer 624 and start relay 628.

In situations where the heavy machinery or vehicle has been used without problem or hazard detection, at the end of operation when the operator is finished using the equipment, the ignition switch 602 is turned off, and the timer 624 will once again start its countdown. Once the countdown is completed without the ignition switch 602 being restarted, the PLC 610 will send power to unlatch the contactors 612 and 614 and isolate the battery 616, facilitating a longer battery life since the battery will be isolated from the machine while the machine is not in use.

Figure 8:
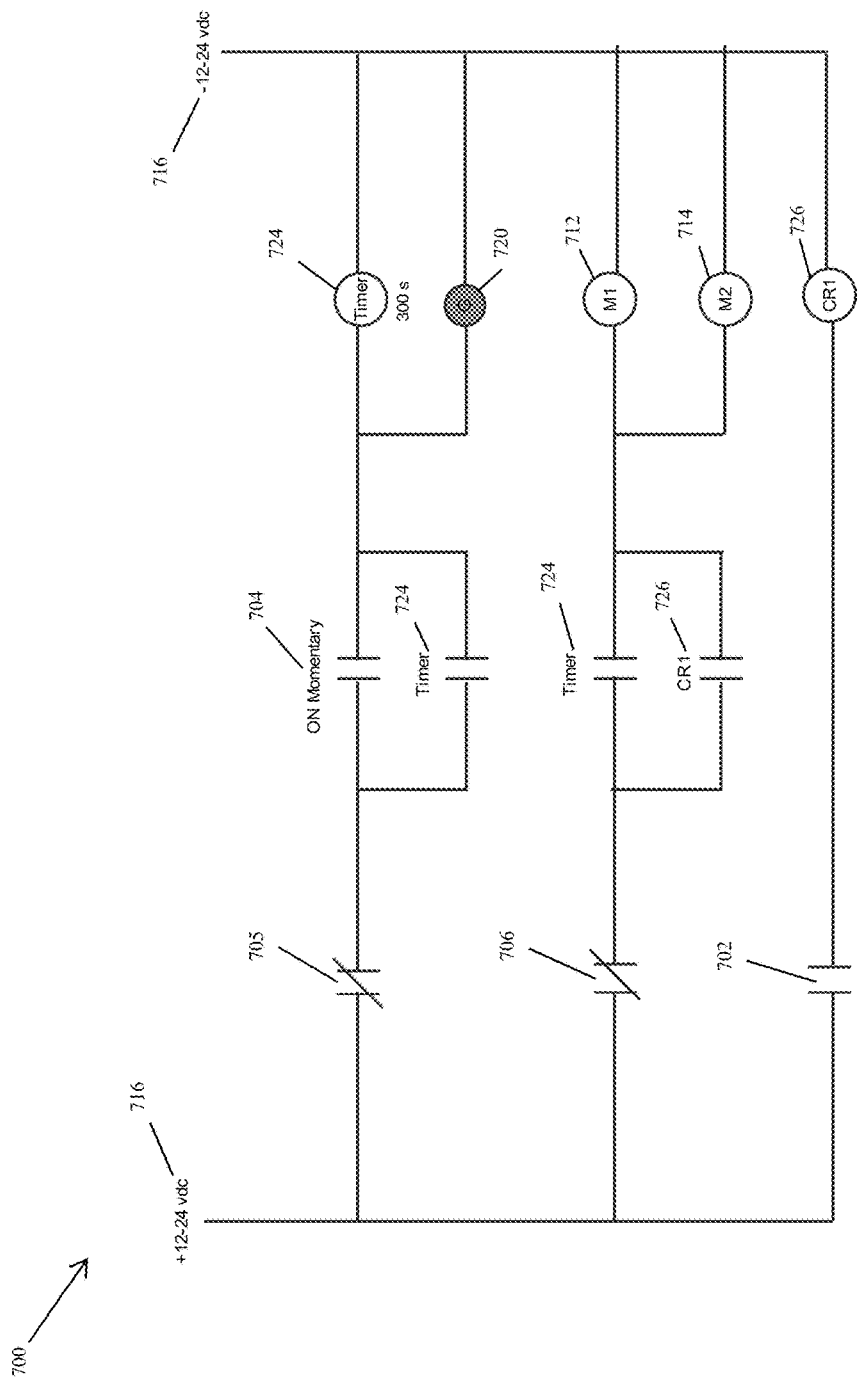
FIG. 8 is a circuit diagram of another embodiment of the invention.

In another embodiment of the disclosed invention, as shown in FIG. 8, a battery interrupter system 700 includes an ignition switch 702 and a push button 704, or "on" button, which initiates the system 700. When an operator presses the push button 704 to initiate the system 700, the push button 704 sends an input signal to a programmable logic controller 710, or PLC, to begin starting or initiating the system 700.

When the operator first begins initiating the system 700, from a cold start, contactors 712 and 714 are in an open position, essentially isolating the battery 716, or batteries, from the rest of the system 700. By isolating the battery 716 in this way, the system 700 is not receiving any power, or open to receive power, from the battery 716, thereby conserving the battery power and limiting susceptibility to fire within the system 700. The battery 716 may be 12 volts, as shown in FIG. 8, or may be 24 volts or another desired voltage.

When the PLC 710 receives the input signal from the push button 704, the PLC 710 is programmed to send power to the contactors 712 and 714 causing them to latch in. Additionally, when the PLC 710 receives the input signal from the push button 704, the PLC 710 is programmed to start a timer 724 which begins a predetermined countdown. The countdown can be preset, or changed, if desired. For example, the countdown can be set at 5 minutes, or less, or more. If after the countdown ends and the PLC 710 does not receive an input from an ignition switch 702, then the PLC 710 will time out and send power to the contactors 712 and 714 to unlatch them and again isolate the battery 716. When the contactors are latched in an active state indicator light 720 may illuminate. The indicator light 720 may be visible to the operator to ensure that the system 700 is active and functioning properly.

As also illustrated in the circuit diagram in FIG. 8, when the contactors 712 and 714 are latched in and an input signal from the ignition switch 702 is received by the PLC 710, the battery 716 will maintain connection with the contactors 712 and 714 and provide power to the system 700 in an active state. When the system 700 is in the active state, the system 700 is monitored by at least one sensor 705 or 706, in at least one of three ways. The sensor 706 can monitor pressure, as with an Ansul system, or monitor heat, with a spot detector, or monitor flames, as with a fire eye sensor. The sensors 705 and 706 in FIG. 8 are pressure monitoring or heat monitoring sensors, such as a Ansul or spot detector sensors. If at any time the sensor 706 detects a hazard or problem, the sensor 706 sends a signal to the PLC 710.

Upon receiving a hazard signal from the sensor 706 the PLC 710 sends power, a voltage, to unlatch the contactors 712 and 714 to again isolate the battery and mitigate any damage done by the hazard. If no hazard is detected then the sensor will maintain the completed circuit through the timer 724 and start relay 728.

In situations where the heavy machinery or vehicle has been used without problem or hazard detection, at the end of operation when the operator is finished using the equipment, the ignition switch 702 is turned off, and the timer 724 will once again start its countdown. Once the countdown is completed without the ignition switch 702 being restarted, the PLC 710 will send power to unlatch the contactors 712 and 714 and isolate the battery 716, facilitating a longer battery life since the battery will be isolated from the machine while the machine is not in use.

It will be appreciated that the structure and apparatus disclosed herein is merely one example of a means for providing a battery interrupter, and it should be appreciated that any structure, apparatus or system for a battery interrupter which performs functions the same as, or equivalent to, those disclosed herein are intended to fall within the scope of a means for providing a battery interrupter, including those structures, apparatus or systems for providing a battery interrupter which are presently known, or which may become available in the future. Anything which functions the same as, or equivalently to, a means for providing a battery interrupter falls within the scope of this element.

Those having ordinary skill in the relevant art will appreciate the advantages provide by the features of the present disclosure.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A battery interrupter system comprising:
a electrical motor for a machine;
at least one battery which powers an electrical system of a machine;
a programmable logic controller electrically connected to the electrical system;
an ignition electrically connected to the programmable logic controller;
a button, which initiates the battery interrupter system, is connected to the programmable logic controller;
at least one contactor electrically connected to the at least one battery and the programmable logic controller, wherein the programmable logic controller is configured to sends a signal to the at least one contactor to latch-in the contactor and enable an electrical connection between the at least one battery and the electrical system of the machine; and
a detection sensor electrically connected to the programmable logic controller, wherein the detection sensor identifies operating conditions of the electrical system.

2. The battery interrupter system of claim 1, wherein the detection sensor identifies heat conditions.

3. The battery interrupter system of claim 1, wherein the detection sensor identifies pressure conditions.

4. The battery interrupter system of claim 1, wherein the detection sensor identifies fire conditions.

5. The battery interrupter system of claim 1, wherein the programmable logic controller includes a timer configured to measure the time between the initiation of the button and the initiation of the ignition, and wherein if a predetermined amount of time lapses between when the initiation of the button and the initiation of the ignition occurs, the programmable logic controller will send a signal to the at least one contactor to unlatch the contactor and disrupt the electrical connection between the battery and the electrical system.

6. The battery interrupter system of claim 1, wherein the detection sensor is configured to send a signal to the programmable logic controller when a predetermined condition is detected, and when the predetermined connection is detected the programmable logic controller will send a signal to the at least one contactor to unlatch the contactor and disrupt the electrical connection between the battery and the electrical system.

7. The battery interrupter system of claim 6, wherein the predetermined condition is a heat condition.

8. The battery interrupter system of claim 6, wherein the predetermined condition is a pressure condition.

9. The battery interrupter system of claim 6, wherein the predetermined condition is a fire condition.

10. A battery interrupter system comprising:
a machine having an electrical system;
at least one battery which powers the electrical system of the machine;
a programmable logic controller electrically connected to the electrical system;
an ignition electrically connected to the programmable logic controller;
a button, which initiates the battery interrupter system, is connected to the programmable logic controller;
at least one contactor electrically connected to the at least one battery and the programmable logic controller, wherein the programmable logic controller is configured to sends a signal to the at least one contactor to latch-in the contactor and enable an electrical connection between the at least one battery and the electrical system of the machine; and,
wherein the programmable logic controller includes a timer configured to measure the time between the initiation of the button and the initiation of the ignition, and wherein if a predetermined amount of time lapses between when the initiation of the button and the initiation of the ignition occurs, the programmable logic controller will send a signal to the at least one contactor to unlatch the contactor and disrupt the electrical connection between the battery and the electrical system.

11. The battery interrupter system of claim 10, further comprises:
a detection sensor electrically connected to the programmable logic controller, wherein the detection sensor identifies operating conditions of the electrical system.

12. The battery interrupter system of claim 11, wherein the detection sensor identifies heat conditions.

13. The battery interrupter system of claim 11, wherein the detection sensor identifies pressure conditions.

14. The battery interrupter system of claim 11, wherein the detection sensor identifies fire conditions.

15. The battery interrupter system of claim 11, wherein the detection sensor is configured to send a signal to the programmable logic controller when a predetermined condition is detected, and when the predetermined connection is detected the programmable logic controller will send a signal to the at least one contactor to unlatch the contactor and disrupt the electrical connection between the battery and the electrical system.

16. The battery interrupter system of claim 15, wherein the predetermined condition is a heat condition.

17. The battery interrupter system of claim 15, wherein the predetermined condition is a pressure condition.

18. The battery interrupter system of claim 15, wherein the predetermined condition is a fire condition.

* * * * *